(12) United States Patent
Martini (10) Patent No.: US 7,998,440 B2
(45) Date of Patent: Aug. 16, 2011

(54) RECLAIMING OF LEAD IN FORM OF HIGH PURITY LEAD COMPOUND FROM RECOVERED ELECTRODE PASTE SLIME OF DISMISSED LEAD BATTERIES AND/OR OF LEAD MINERALS

(75) Inventor: Federica Martini, Spinea (IT)

(73) Assignee: Millbrook Lead Recycling Technologies Limited, Dublin (IE)

( * ) Notice: Subject to any disclaimer, the term of this patent is extended or adjusted under 35 U.S.C. 154(b) by 0 days.

(21) Appl. No.: 12/611,630

(22) Filed: Nov. 3, 2009

(65) Prior Publication Data

US 2010/0043600 A1    Feb. 25, 2010

Related U.S. Application Data

(63) Continuation-in-part of application No. 12/523,096, filed as application No. PCT/IT2008/000022 on Jan. 15, 2008, application No. 12/611,630, which is a continuation-in-part of application No. PCT/IT2009/000344, filed on Jul. 30, 2009.

(30) Foreign Application Priority Data

Jan. 17, 2007    (IT) .............................. VA2007A0007

(51) Int. Cl.
C01G 21/00    (2006.01)

(52) U.S. Cl. ................ 423/92; 423/93; 423/95; 423/98; 423/435; 423/619

(58) Field of Classification Search .............. 423/92–95, 423/98, 435, 619
See application file for complete search history.

(56) References Cited

U.S. PATENT DOCUMENTS

| | | | |
|---|---|---|---|
| 2,152,242 A * | 3/1939 | Curtin | 423/95 |
| 2,187,749 A * | 1/1940 | Marvin | 423/95 |
| 4,220,628 A | 9/1980 | Striffler, Jr. et al. | |
| 4,269,811 A | 5/1981 | Striffler, Jr. et al. | |
| 4,769,116 A | 9/1988 | Olper et al. | |
| 4,927,510 A * | 5/1990 | Olper et al. | 423/95 |
| 5,127,963 A | 7/1992 | Hartup et al. | |

FOREIGN PATENT DOCUMENTS

| | | |
|---|---|---|
| EP | 1619261 A1 | 1/2006 |
| GB | 2183623 A | 6/1987 |
| WO | WO-0121846 A1 | 3/2001 |
| WO | WO-2005007904 A1 | 1/2005 |

* cited by examiner

*Primary Examiner* — Steven Bos
(74) *Attorney, Agent, or Firm* — Connolly Bove Lodge & Hutz LLP

(57) ABSTRACT

An outstandingly low environmental impact wet process recovers the lead content of an electrode slime and/or of lead minerals in the valuable form of high purity lead oxide or compound convertible to highly pure lead oxide by heat treatment in oven at relatively low temperature, perfectly suited for making active electrode pastes of new batteries or other uses. The process basically comprises the following treatments:

a) suspending the impure lead containing material in an aqueous bath containing at least a lead oxide dissolving acid;
b) reducing any insoluble lead dioxide to lead oxide by introducing in the suspension either hydrogen peroxide, a sulphite or sulphurous anhydride;
c) converting all dissolved lead oxide to lead sulphate in the aqueous bath;
d) obtaining a solution of lead sulphate obtained in an aqueous solution containing an acetate salt;
e) precipitating and separating a purified lead compound in the form of either carbonate/oxycarbonate or of oxide/or hydroxide by adding to said acetate salt solution a carbonate salt or a hydroxide of the same cation of said acetate salt, respectively.

Exemplary flow sheets according to several alternative embodiments and related processing plant diagrams are disclosed.

11 Claims, 4 Drawing Sheets

| | Steps | ←inlet substances<br>→outlet substances |
|---|---|---|
| (1) | Reducing, solfatation and solubilization | ← raw electrode slime<br>← make up sodium acetate<br>← sulphuric acid<br>← hydrogen peroxide<br>← acetate leach solution recycling |
| (2) | Filtration ↓ | → insoluble compounds and solid impurities |
| (3) | Oxide formation > 72-73°C ↓ | ← sodium hydroxide |
| | Hydroxide formation < 72-73°C ↓ | ← sodium hydroxide |
| | Carbonate formation ↓ | ← sodium carbonate |
| (4) | Filtration ↓ | → lead oxide or<br>→ lead hydroxide or<br>→ lead carbonate |
| (5) | Solution depuration ↓ | → lead acetate to (1)<br>← acetic acid |
| (6) | Crystallization ↓ | |
| (7) | Filtration ↓ | → sodium sulphate |
| (8) | Solubilising salt solution recycling to (1) ↓ | |

| | Steps | ←inlet substances<br>→outlet substances |
|---|---|---|
| (2 Bis) | Insoluble compounds and solid impurities from step (2) ↓ | ← sodium hydroxide |
| (2 Bis) | Filtration | → insoluble compounds<br>→ soluble lead plumbite to step (3) |

RECLAIMING OF LEAD IN FORM OF HIGH PURITY LEAD COMPOUND FROM RECOVERED ELECTRODE PASTE SLIME OF DISMISSED LEAD BATTERIES AND/OR OF LEAD MINERALS

BACKGROUND OF THE INVENTION

Valuable high purity lead compound and eventually metallic lead is obtained from minerals as well as from electrode paste or slime recovered from dismissed lead batteries by pyrometallurgy according either to a very high temperature (1500-1700° C.) process with attendant generation of large quantities toxic fumes to be abated, or to a high temperature (1000-1100° C.) process, as often practiced in case the starting material is recovered electrode paste, that implies a significant by-production of toxic slags to be disposed of as dangerous substances in special dumps.

An attempt to improve these situations has been pursued through a carbonation technique of the raw (impure) electrode paste in plants for producing secondary lead.

This technique gives substantial advantages in terms of reduced impact on the environment but poor economical results and therefore has not encountered diffused acceptance in the industry. Many have endeavoured to improve the performance of this technique as testified by the numerous patent publications such as: U.S. Pat. No. 5,827,347, also published as WO9966105; U.S. Pat. No. 5,840,262 also published as WO9858878; the European Patents No. 1619261, No. 1656463; the Italian Patent No. 01239001; the U.S. Pat. No. 4,336,236 and No. 1,738,081; the BP patents No. 239,257 and No. 272,053; the Belgian Patents No. 273,660 and No. 691,028 as well as the project "Cleanlead Gypsum" partially financiated by the European Union.

Lead is extracted from a lead mineral such as galena, through a high temperature (over 1500° C.) pyro-metallurgical process that produces impure lead. All sulphur present in the starting material is converted to $SO_2$ such that generally to the pyro-metallurgical plant is associated a plant for producing sulphuric acid in order to avoid inertization of $SO_2$ in the form of $CaSO_4$, which has an extremely low commercial value.

OBJECTIVES AND SUMMARY OF THE INVENTION

It has now been found and is the object of the claimed invention a wet process that achieves a practically complete conversion of the lead content of recovered electrode paste or slime from dismissed lead batteries, typically a grossly impure mixture (sulphate, oxysulphate and dioxide) of lead that compose the electrode paste of a used battery and/or of a lead mineral, to a compound lead of very high purity.

Essentially the novel method of this invention for reclaiming lead in form of high purity lead compound from recovered electrode paste slime of dismissed lead batteries and/or of lead minerals is based on the following actions:
a) suspending the impure lead containing material in an aqueous bath containing at least a lead oxide dissolving acid;
b) reducing any insoluble lead dioxide to lead oxide by introducing in the suspension either hydrogen peroxide, a sulphite or sulphurous anhydride;
c) convert all dissolved lead oxide to lead sulphate in the aqueous bath;
d) obtaining a solution of lead sulphate in aqueous solution of an acetate salt of either sodium, potassium or ammonium;
e) precipitating and separating a purified lead compound in the form of either carbonate/oxycarbonate or of oxide/or hydroxide by adding to said acetate salt solution a carbonate salt or a hydroxide of the same cation of said acetate salt, respectively.

Lead is reclaimed in form of either lead carbonate/oxycarbonate or of lead oxide/hydroxide by adding a carbonate salt or a hydroxide, preferably of the same cation of the acetate salt. Eventually the obtained high purity lead carbonate/oxycarbonate mixture may be successively converted through a relatively low temperature heat treatment in oven to lead oxide of extremely high purity, above 99.9%, which is perfectly suitable to be used for preparing electrode pastes of new batteries.

According to a first embodiment of the process of this invention, the impure material is subjected to the following steps directly without any pyrometallurgical pre-treatment:
1) acid leaching of the impure material employing an acid different from sulphuric acid and capable of forming soluble salts of Pb(II) such as for example acetic acid, nitric acid, fluo-boric acid and fluo-silicic acid;
2) adding to the acid leach suspension either hydrogen peroxide or a sulphite or bubbling sulphurous anhydride through it for reducing undissolved lead dioxide to lead oxide which dissolves in the acid leach solution;
3) adding sulphuric acid to the acid leach suspension for reacting with dissolved lead oxide contained in the acid leach solution forming insoluble lead sulphate;
4) separating the solid phase of the sulphatated suspension constituted by lead sulphate and of undissolved impurities of the starting material, recovering of the clarified acid leach solution, and eventual recycling it to step 1);
5) treating the separated solid phase with an aqueous solution containing compounds capable of selectively dissolving the sulphate, as for example sodium acetate, potassium acetate or ammonium acetate, though even other lead sulphate dissolving compounds could be satisfactorily used such as: acetates of urea, mono-, di-, tri-ethanol amine, methyl, ethyl, propyl amine and of other amines and hydrosoluble amides, sodium thiosulphate;
6) separating a clear solution from the undissolved solid residues now constituted only by the impurities present in the starting impure material;
7) adding to the clear solution containing lead sulphate dissolved in the solubilizing solution a carbonate or a hydroxide of the same cation of the selected dissolving compound, for precipitating either insoluble lead carbonate and/or oxycarbonate or directly lead oxide or hydroxide (depending on the temperature at which precipitation is carried out) and forming correspondent soluble sulphate of the cation of the carbonate salt employed in the solubilizing solution;
8) separating the lead carbonates or oxide/hydroxide from the solution;
9) controlled cooling or heating of the clear solution for selectively crystallizing and separating sulphate of the cation of the carbonate salt added to the solubilizing solution and eventually recycling the clear solution to step 5).

The so recovered mixture of lead carbonates or the lead oxide/hydroxide and the sulphate of the cation of the carbonate salt used have both a high level of purity.

Lead carbonates separated from the solution may be commonly converted to lead oxide and $CO_2$ by heating in oven at a relatively low temperature without adding any reagent. The lead oxide that is obtained has a purity in excess of 99.9% (normally higher than 99.99%) and may be used directly for preparing new batteries.

Of course, the mixture of highly pure carbonate and oxycarbonate of lead or the lead oxide/hydroxide that is produced may even be employed as starting material for producing other useful lead compounds or for producing metallic lead by thermal reduction or electrolysis.

An alternative and generally preferred embodiment has been found by the applicant achieving an outstandingly effective simplification of the all-wet lead reclaiming process flow of her invention as not only viable but even more cost efficient in terms of reduced plant complexity and inventory of treatment vessels and related agitators, heaters and/or coolers, filters, pumping and energy requirements.

The alternative embodiment consists in directly suspending the impure starting material in a lead sulphate dissolving aqueous solution of an acetate salt and adding thereto either hydrogen peroxide or a sulphite or alternatively bubbling sulphurous anhydride through it, in a measure adapted to reduce any lead dioxide expected to be present in the impure starting material to lead oxide, and sulphuric acid in a measure adapted to convert all lead oxide to lead sulphate that remains dissolved in the lead sulphate dissolving salt solution.

A limpid solution containing the dissolved lead sulphate may then be separated from a solid phase residue that includes all undissolved impurities contained in the impure starting material.

Together with the solid phase of all insoluble substances, separated from the lead sulphate dissolving acetate salt solution, depending on the origin of the impure starting material to be processed, there may be present certain compounds of lead such as oxysulphates or other oxides that could not be dissolved in the acetate salt solution. Even the residual lead content of these compounds that remain undissolved by the acetate salt solution can eventually be reclaimed, if considered economically viable or, for other reasons, desirable to do so. This can be carried out by suspending the separated solid phase consisting of impurities and insoluble compounds of lead in a concentrated solution of hydroxide of the same cation of the acetate salt for decomposing and convert these compounds to soluble plumbites, that dissolve in the hot hydroxide solution which may then be separated from the remaining insoluble impurities. The hydroxide solution now containing the residual lead stripped from the previously separated solid phase of impurities may be introduced in the liquid acetate solution containing the lead sulphate in the vessel in which hydroxide of the same cation of the acetate salt is introduced for precipitating the lead contained as lead sulphate in the liquid acetate solution in form of lead oxide or hydroxide.

Precipitation of high purity lead compound from the clear lead sulphate solution may then by effected either by adding to the solution carbonate of the same cation of the acetate salt used for selectively dissolved lead sulphate for precipitating insoluble carbonate/oxycarbonate of lead or, more preferably, instead of a carbonate salt, to the clear solution of lead sulphate is added hydroxide of the same cation of the acetate salt used for selectively dissolved lead sulphate for causing precipitation of either oxide or hydroxide of lead, depending from the temperature of the precipitation bath, thus eliminating the burden of eventually having to convert the reclaimed lead carbonate to lead oxide by heating the carbonate in an oven.

The applicant has found that whether a carbonate salt or a hydroxide is used for causing it, precipitation of all lead in the solution as highly pure lead compound is practically complete. Therefore, separation of a solid phase of the highly pure lead compound from the acetate solution is carried out from the same acetate solution in which the impure starting material had been suspended.

Though the clear solution of acetate salt becomes progressively enriched of sulphate of the same cation of the acetate salt used for selectively dissolving lead sulphate, it may be recycled to the suspension step of the impure starting material for as long as the sodium sulphate concentration remains below saturation. When the sulphate concentration in the clear acetate salt solution approaches saturation, the solution may be cooled to about 10° C. for selectively crystallizing and precipitating solid phase constituted by sulphate of the cation of the acetate salt used, which is recovered by filtering. The clear acetate salt solution freed of the sulphate salt may then be recycled to the suspension bath of the impure starting material.

Preferably, before cooling it for selectively crystallizing and precipitating solid phase constituted by sulphate of the cation of the acetate salt used, the acetate solution is percolated through a column filled with chelating resin for sequestering any residual lead ions in the solution, before cooling the solution in order to produce lead-free sulphate salt, as a by-product, of broader market acceptance.

The basic operations contemplated by the novel processes of this invention are all performed in aqueous suspension or solution at atmospheric pressure, with indoubtable advantages from the point of view of reduced energy consumption and reduced environmental impact. Moreover, only simple apparatuses of generally common use in the chemical industry, such as for example stirred reactors, dosing pumps, filters and crystallizers are needed.

DESCRIPTION OF EMBODIMENTS OF THE INVENTION

Figure 1:
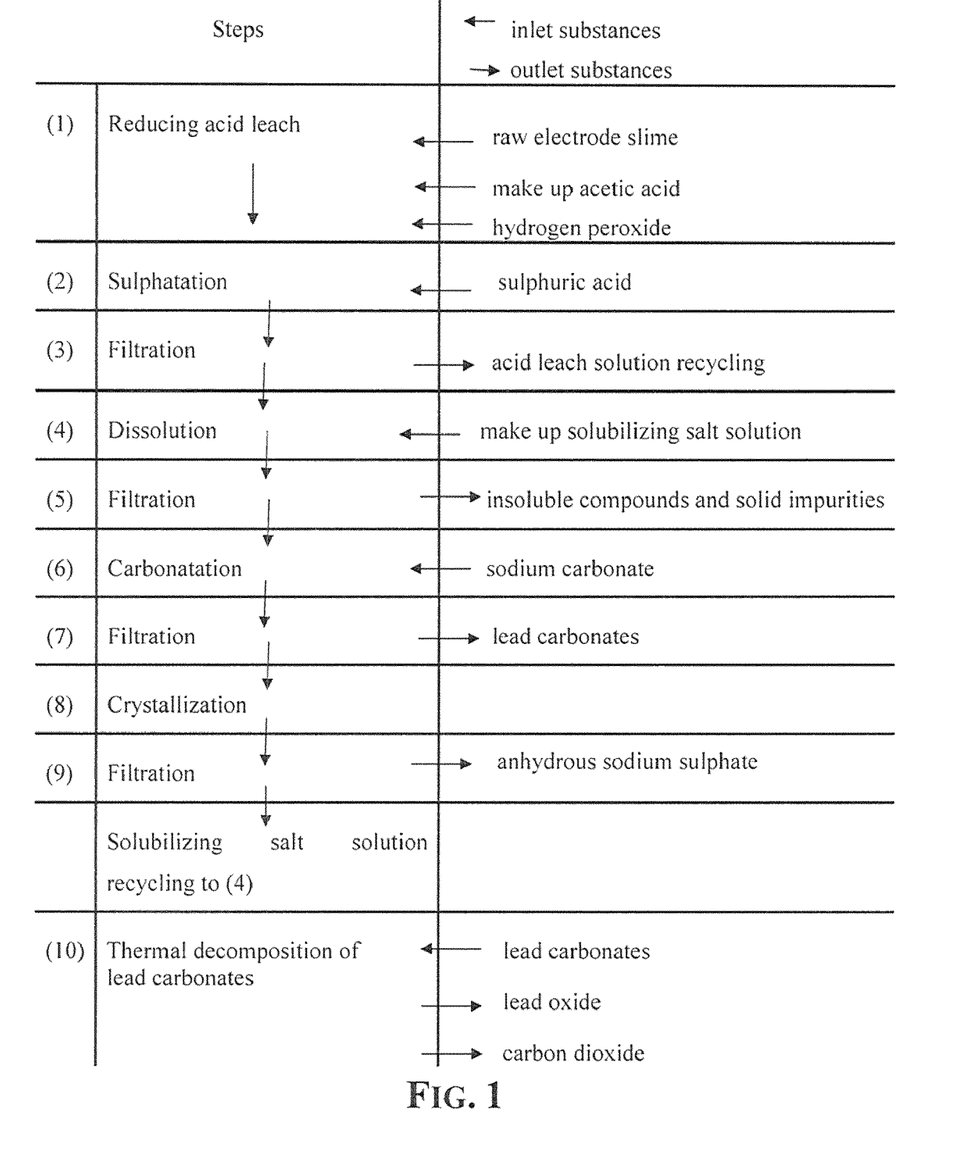
FIG. 1 is a flow sheet of the main steps of a process for the recovery of lead carbonates from battery electrode slime according to a first embodiment.
Figure 2:
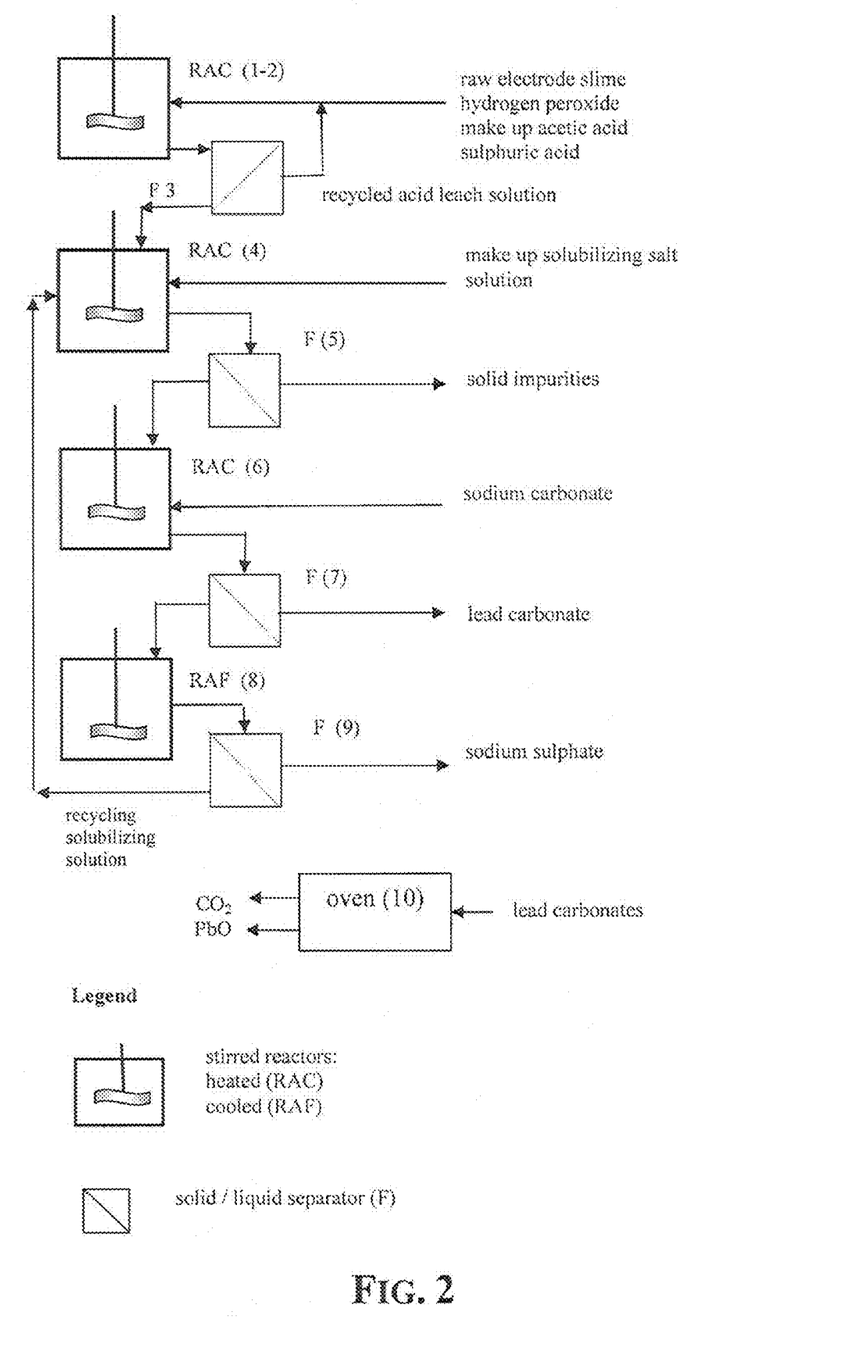
FIG. 2 is a simplified diagram of a plant for recovering lead according to the process of FIG. 1.

According to a first embodiment of the method of this invention, particularly suited for treating raw electrode slime recovered from crushed dismissed batteries, but usable with eventual adaptations with a finely ground lead minerals, an acid leaching of the impure starting material with an acid different from sulphuric acid and capable of leaching compounds of Pb(II) (e.g. lead oxide) is first carried out (step 1) and hydrogen peroxide or sulphurous anhydride or a sulphite is added to the acid leach suspension (step 2) in order to reduce suspended lead dioxide (Pb(IV)) to lead oxide (Pb(II)) that dissolves in the acid leaching solution or to form soluble lead sulphate.

For example an aqueous solution of acetic acid with a concentration that may be comprised between about 3% to 85% by weight can be satisfactorily used with dropwise addition of hydrogen peroxide for leaching completely all the lead (II) oxide and lead (IV) oxide contained in an electrode slime maintained suspended in the acid leach solution at a temperature that may be comprised between about 10° C. up to boiling point, stirring the suspension with a pails or turbine mixer in order to favor disgregation of lead dioxide aggregates.

Alternatively, a leaching solution of nitric acid with a concentration that may be comprised between about 2% and 30% by weight, or of fluoboric acid or fluosilicic acid in a concentration that may generally be comprised between about 5% and 40% by weight may be used instead of acetic acid.

The combination of the chosen leaching conditions (type and concentration of the acid, eventual hydrogen peroxide addition, temperature and stirring mode will influence the time needed for completing these steps of dissolution and/or reduction-dissolution of all the lead (II) oxide and lead (IV) oxide contained in the starting material.

Contrarily to the long established approach of prior art processes, according to a fundamental aspect of the process of this invention, a practically complete sulphatation of all the lead causing its precipitation as insoluble lead sulphate that is then separated from a thus clarified solution together with all undissolved impurities present in the impure starting material is carried out (steps 3-4).

The sulphuric acid used for this step should preferably have a high concentration in order not to excessively dilute the acid leach solution. The sulphuric acid may be introduced in a stoichiometric amount or slightly above it on the basis of an estimated content of dissolved lead in the suspension.

Thereafter, a selective dissolution of lead sulphate in respect to the other undissolved impurities separated from the acid leach solution is performed by suspending the separated solid fraction in an aqueous solution of an acetate or other suitable salt (step 5).

With the method of this invention a clear solution in which is present lead sulphate as the only dissolved salt other than the salt employed for making the solubilizing solution is obtained.

The subsequent carbonation reaction of the clear solution containing lead sulphate, by adding to the solution a carbonate of sodium or of potassium or of ammonium as commonly used for such a reaction (step 7) causes the selective precipitation of lead carbonate and of lead oxycarbonate because these salts have a solubility that is much lower than that of lead sulphate.

Once the reaction is complete, the precipitated lead carbonates are separated by filtration from the solution while sulphate of the cation of the carbonate salt used for precipitating the lead generally as a mixture of lead carbonate and of lead oxycarbonate remains in the solution.

The clear solution containing the sulphate of the cation of the carbonate salt employed, can be integrally recycled to the step of selective dissolution of the lead sulphate (step 5) of the process, for as long as the content of sulphate of the cation of the carbonate salt used does not reach saturation (this limit depending on the type of solution being used for dissolving the lead sulphate). Precipitation of the sulphate salt together with the lead carbonates must be prevented. Therefore, excess sulphate salt must be eventually eliminated from the solution before approaching saturation. This may be easily done by exploiting the different solubilities at different temperatures of the sulphate salt (i.e. of sodium, potassium or ammonium sulphate).

The concentration of the aqueous solubilizing salt solution and the temperature at which dissolving of the lead sulphate in it is carried out are not essential parameters because they simply influence the time necessary for completing the treatment and the quantity of lead sulphate that may be dissolved in the solution. In practice, the solubilizing solution, after precipitation of the dissolved lead as carbonate, is recycled back and therefore when operating with a recycled solution with a declining concentration of acetates, more and more recycles may be necessary to complete dissolution of a given quantity of lead sulphate.

The lead carbonate and/or oxycarbonate that are obtained can be thermally decomposed in a rotating oven at the temperature of 350° C. thus obtaining extremely pure lead oxide (>99.9%) that is perfectly suitable for preparing electrode pastes for new batteries.

It has been found and is an optional accessory aspect of the preset invention that it is possible to make with the lead oxide obtained by the process of this invention an electrode paste that may be employed even days after having been prepared. As a matter of fact, production and storage of lead oxide in the form of a paste reduces safety problems for operators attributable to the pulverulent form of lead oxide. According to an embodiment, the lead oxide is transformed into a paste by mixing 90.8% by weight of lead oxide with 7.49% by weight of water and 1.7% by weight of pure glycerin.

Similar results are obtained by employing as humidifying polar substance instead of glycerin, ethylenic, propylenic or polyethylenic glycol having an average molecular weight comprised between 100 and 2000. The amount of humidifying polar substance to be added, may vary between about 1% and about 3% by weight, the consistency of the dough that is obtained is substantially the same, the only difference being in the storability of the prepared paste that will be possible for longer and longer time the greater is the quantity of polar substance that is added. These polar substances do not alter the normal functioning of the battery, because they do not interfere with the electrodic processes.

The practice of the process of this invention using as starting material a mineral or a mixture of minerals of lead may be completely similar to the above described process, an essential step being that of converting for as much as possible any different salt or lead present in the mineral to either lead sulphate or to lead oxide form. For example, in case of galena, certainly the most common lead mineral, the mineral must be heated in air, according to common techniques until oxidizing the lead sulphide to sulphate. The other common mineral anglesite does not need prior treatment being itself already constituted by lead sulphate. Of course the mineral(s) should be finely ground for facilitating the contemplated wet process steps.

Herein below several examples are reported solely for illustrating different possible embodiments of the process of this invention without in any manner meaning to exclude other possible embodiments.

Example 1

15 g of recovered dried electrode paste having a lead content, expressed as metal equivalent, of 72% was treated under stirring for 10 minutes with 100 ml aqueous solution of acetic acid at 15% by weight, at the temperature of 50° C. After 10 minutes hydrogen peroxide at 32% by weight has been added dropwise until obtaining a no longer increasing clarification of the suspension.

The stirring of the suspension was maintained for further 35 minutes and thereafter sulphuric acid at 96% by weight was added to the clarified suspension. The hot suspension was then filtered and the recovered solid phase was rinsed with a small quantity of de-ionized water whilst the recovered limpid solution was found to be practically free of lead and was thereafter employed for acid leaching a fresh 15 grams amount of dried electrode paste at the same treatment conditions.

This sequence of steps was repeated 24 times and the repeatedly recycled acid leach solution did not show any impairment of its effectiveness.

The recovered solid phase was suspended in a solution composed of 60 g of sodium acetate and 100 g of water and kept under stirring for 30 minutes at the temperature of 70° C. Thereafter the suspension was filtered for separating a limpid solution containing lead sulphate in the form of a soluble complex and a solid phase of dark grey color that was recycled to the initial step of acetic acid leach.

The limpid solution containing lead sulphate was stirred at 36° C. adding thereto sodium carbonate until reaching a practically complete precipitation of the lead in the form of lead carbonate and lead oxycarbonate. The suspension was thereafter filtered separating the lead carbonates from the solubilizing solution of sodium acetate now enriched of sodium sulphate that was maintained at the temperature of 36° C. and recycled to the step of dissolution of the lead sulphate as long as the content of sodium sulphate in solution remained below saturation.

At this point, the solution was slowly cooled to 15° C. under slow stirring. A crystalline solid phase constituted by sodium sulphate was recovered by filtering the suspension while the clear solution was recycled to the dissolving step of the lead sulphate.

The filtered lead carbonate and oxycarbonate accurately rinsed with de-ionized water were dried at 110° C. for as long as reaching constancy of weight.

At the end the following mass balance was recorded.

In each 15 g amount of recovered electrode paste used in the experiment, were present 1.2 g of insoluble substances of dark grey color containing metallic lead and extraneous substances such as sand, carbon black, barium sulphate, etc.

The maximum quantity of recoverable lead carbonate was of 13.02 g while the quantity of lead carbonate effectively recovered was of 12.89 g for a recovery yield of 99%.

Chemical analysis of the solid product recovered was constituted exclusively by the double salt of formula $2PbCO_3 \cdot PbO$ and by $PbCO_3$ at 99.99% purity, while the sodium sulphate that was eventually recovered had a purity of about 99.90%.

The following table summarizes relevant conditions, peculiarity and results of the process of the above Example 1 described in detail together with relevant conditions peculiarity and results that were obtained, always using as starting material 15 g of electrode paste of the same lot recovered from crushed dismissed batteries, according to nine different examples of practicing the method of this invention.

|  | Acid leach | Solubilizing solution | Temp. °C. | Stirring min. | Pb recovered as carbonate |
|---|---|---|---|---|---|
| Example 1 | 15% acetic acid at 50° C., 45 min. | Sodium acetate 60 g/100 g $H_2O$ | 70 | 30 | 99.0 |
| Example 2 | 5% nitric acid at 50° C., 30 min. | Sodium acetate 60 g/100 g $H_2O$ | 70 | 30 | 99.89 |
| Example 3 | 10% acetic acid at 70° C., 60 min. | Sodium acetate 60 g/100 g $H_2O$ | 70 | 60 | 99.78 |
| Example 4 | 50% acetic acid at 35° C., 180 min . . . | Sodium acetate 60 g/100 g $H_2O$ | 70 | 180 | 98.84 |
| Example 5 | 70% acetic acid at 35° C., 180 min. | Ammonium acetate 60 g/100 g $H_2O$ | 50 | 180 | 98.51 |
| Example 6 | 5% acetic acid at 50° C., 120 min. | Sodium acetate 60 g/100 g $H_2O$ | 50 | 30 | 94.6 |
| Example 7 | 5% nitric acid at 70° C., 30 min. | Sodium acetate 80 g/100 g $H_2O$ | 70 | 120 | 99.99 |
| Example 8 | 5% fluoboric acid at 50° C., 30 min. | Sodium acetate 60 g/100 g $H_2O$ | 70 | 30 | 88.39 |
| Example 9 | 5% fluosilicic acid at 50° C., 30 min. | Sodium acetate 60 g/100 g $H_2O$ | 70 | 30 | 86.37 |
| Example 10 | 15% acetic acid at 50° C., 30 min. | Mono-ethanolamine acetate 70 g/50 g $H_2O$ | 70 | 30 | 19.65 |

Example 11

5 g of lead carbonate salts mixture obtained according to the process described in Example 1, were heated in oven up to 350° C. and maintained at this temperature for 60 minutes.

At the end of the treatment 4.17 g of a pulverulent substance of yellow color were recovered. The yellow substance proved to be constituted by α lead oxide of purity above 99.99%.

Example 12

5 g of lead carbonate salts mixture obtained according to the process described in Example 7, were heated in oven up to 450° C. and maintained at this temperature for 60 minutes.

At the end of this treatment 4.17 g of a pulverulent substance having an orange color were recovered. The substance proved to be constituted by β lead oxide of purity greater than 99.99%.

To 3 g of lead oxide were added water and pure glycerin in order to obtain a mixture having the following composition by weight:
lead oxide 91%, water 7%, glycerin 2%.

The mixture was accurately mixed obtaining a paste with the consistency of a stucco. The paste was placed in a sealed container and after 12 hours its consistency was verified. The paste was found to practically retain the same consistency for as long as 72 hours from its preparation.

Example 13

1000 g of lead carbonate mixture obtained according to the processing choices of Example 2, was treated in an externally heated, rotating tubular oven.

The temperature inside the oven was maintained at 350° C. for one hour and during the treatment a stream of 30 liters of pure anhydrous nitrogen was passed through the oven.

The gases exiting the oven were conveyed to a condenser and cooled down to the temperature of −80° C. in order to liquefy the carbon dioxide released during the thermal decomposition of the carbonates. At the end of the test, 160 g of extremely pure carbon dioxide were recovered, usable even for gassing beverages.

Figure 3:
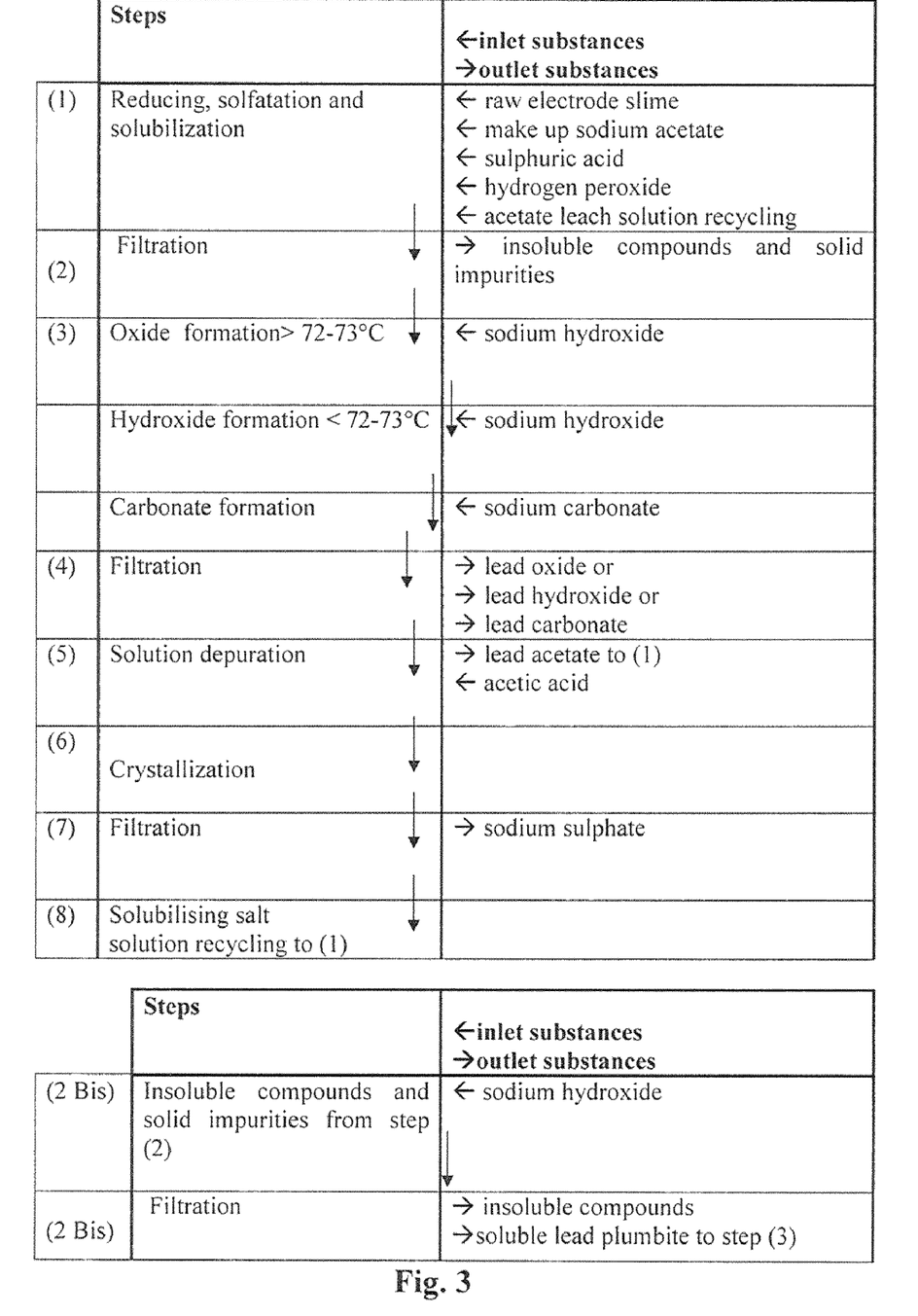
FIG. 3 is a flow sheet of the main steps of the process for reclaiming high purity lead oxide from dismissed battery electrode slime or lead minerals, for alternatively producing pure lead carbonate/oxycarbonate or pure lead oxide/hydroxide, according to a second embodiment.

The flow sheet of FIG. 3 illustrates the main steps of a process of this invention according to an alternative embodiment, particularly suited for treating raw electrode paste slime recovered from crushed dismissed batteries, but usable alike the process of the first embodiment with eventual trivial adaptations, also with finely ground lead minerals, for example galena commonly roasted for converting lead sulphite to lead sulphate, anglesite and lesser common minerals.

As shown in the exemplary flow sheet, the impure starting solid material is suspended in an aqueous solution of a salt capable of dissolving lead sulphate, such as for example an acetate salt of either sodium, potassium or ammonium.

To this suspension, sulphuric acid is added in an amount necessary to convert all oxides present in the starting material to sulphate and a reducing agent chosen among hydrogen peroxide, a sulphite salt and sulphurous anhydride, is gradually added or bubbled through the suspension bath in an amount necessary to reduce any lead dioxide that may be contained in the starting material (as would be the case with slime from discarded lead batteries) to lead oxide.

Therefore, in this first Step (1) of the process flow sheet of FIG. 3, in the suspension bath of the starting material take place the chemical reactions that are formally described herein below, considering that they take place simultaneously, causing the conversion of substantially all lead compounds to sulphate that dissolves in the aqueous solution containing the specific dissolving salt mentioned above.

The below described reactions make clearly recognizable the existence of a synergical action that results in a sensible increment of the speed of the chemical conversion process, in view of the fact that dissolution of lead sulphate frees the lead oxide to which (for the case of dismissed battery electrode paste slime) it was originally intimately tied within the electrode paste, to form compounds of the type $3PbOPbSO_4$ and $4PbOPbSO_4$, in consequence of which the oxide quickly reacts, transforming itself to sulphate, which in turn dissolves in the acetate salt solution that, in the considered exemplary embodiment, is sodium acetate, while the lead dioxide physically embedded in concretions of the above-identified oxysulphates, become more easily reached by the reacting species and therefore is more readily reduced to lead oxide.

The following reactions relate to an exemplary embodiment of reclaiming high purity lead compound from electrode paste slime of dismissed batteries in which lead sulphate is present as measure component (close to about 60% by weight) in the impure starting material and dissolved in the aqueous solution of sodium acetate.

Reaction 1: Dissolution of Lead Sulphate $$PbSO4(insoluble)+4CH3COONa \rightarrow \text{soluble complex of } PbSO4$$

Reaction 2: Dissolution of Lead Oxide $$2CH3COONa+H2SO4 \rightarrow 2CH3COOH+Na2SO4$$

$$PbO(insoluble)+2CH3COOH \rightarrow Pb(CH3COOH)2(soluble)+H2O$$

$$Pb(CH3COOH)2+Na2SO4 \rightarrow PbSO4(insoluble)+2CH3COONa$$

$$PbSO4(insoluble)+4CH3COONa \rightarrow \text{soluble complex of } PbSO4$$

Reaction 3: Reduction of Lead Dioxide and Dissolution $$2CH3COONa+H2SO4 \rightarrow 2CH3COOH+Na2SO4$$

$$PbO2(insoluble)+H2O2 \rightarrow PbO(insoluble)+H2O+\tfrac{1}{2}O2$$

$$PbO(insoluble)+2CH3COOH \rightarrow Pb(CH3COOH)2(soluble)+H2O$$

$$Pb(CH3COOH)2+Na2SO4 \rightarrow PbSO4(insoluble)+2CH3COONa$$

$$PbSO4(insoluble)+4CH3COONa \rightarrow \text{soluble complex of } PbSO4$$

(Optional) Reaction 4: Solubilization of Insoluble Lead Compounds Possibly Present in the Impure Starting Material Separated Together with Impurities for Reclaiming of Such a Minor Amount of Lead $$4PbO*PbSO4(insoluble)+12NaOH \rightarrow 5Na2PbO2(soluble)+Na2SO4+6H2O$$

By way of example, in order to process electrode paste slime recovered from crushed discarded lead batteries, an aqueous solution of tri-hydrated sodium acetate dissolved in water in a concentration comprised between 37.5 and 54.5% by weight can be satisfactorily used. Sulphuric acid is added in an amount corresponding to or just exceeding the stoichiometric requirement for converting all lead oxides to lead sulphate as pre-evaluated for the impure starting material to be processed. Preferably, after having added the required amount sulphuric acid, to the suspension bath is added hydrogen peroxide the amount of which may also be pre-calculated in terms of the stoichiometric requirement for reducing the lead dioxide contained in the starting material.

The amount of electrode paste that can be treated in a certain volume of solution, depends on the solubilizing capacity of the lead sulphate in the solution of the selected acetate salt and of the added amount of sulphuric acid. The ability of dissolve lead sulphate of the acetate salt solution depends from its salt concentration. By way of example, one liter of aqueous solution with a concentration of 37.5% by weight of sodium acetate is able to dissolve 100 g of lead sulphate. By increasing the concentration of the acetate salt, the amount of lead sulphate that can be dissolved increases proportionally. The temperature at which the above described reactions can be carried out in the suspension bath may be comprised between about 10° C. up to boiling point. The suspension may be stirred with a pails or turbine mixer in order to favor breaking down of lead compound aggregates.

The combination of die chosen operating conditions (type and fineness of the starting solid material, type and concentration of the lead sulphate dissolving salt solution, eventual lead dioxide reducing agent addition, temperature, stirring mode) will influence the time needed for completing this first step (1) of the all-wet reclaiming process. The sulphuric acid used for the sulphation of all the lead oxide in the solution should preferably have a high concentration in order not to excessively dilute the lead sulphate dissolving solution.

Once the reaction time that, depending on the combination of the numerous parameters may generally range between 6 and 15 minutes, a limpid acetate solution containing lead sulphate may be separated from the solid phase residues, for example by filtration. All insoluble impurities and substances are therefore separated from the solution (Step 2 of the flow sheet of FIG. 3).

The subsequent reaction conducted in the limpid acetate solution containing substantially all the lead content of the starting material in form of lead sulphate by adding to the solution a hydroxide of the same cation of the selected acetate salt (i.e. either sodium, potassium or ammonium), according to the preferred alternative contemplated for the Step 3 of the flow sheet of FIG. 3, at a temperature sufficiently high to ensure precipitation of all the lead in solution in form of PbO (of yellow aspect) instead of in form of lead hydroxide (of white aspect) produces a selective precipitation of lead oxide because of its much lower solubility than that of lead sulphate. Generally, the critical temperature is in the vicinity of 70° C., therefore the precipitation may be carried out at about 72-73° C. (unless for some reason one should prefer to recover a highly purified lead hydroxide, thermally convertible to lead oxide eventually).

The other alternative contemplated for the Step 3 of the flow chart of FIG. 3, consists in adding to the liquid acetate solution containing substantially all the lead content of the starting material in the form of lead sulphate, instead of a hydroxide, a carbonate of the same cation of the selected acetate salt (i.e. either sodium, potassium or ammonium), which produces a selective precipitation of lead carbonate or a mixture of lead carbonate and oxycarbonate, because of their much lower solubility than that of lead sulphate. In this alternative embodiment, precipitation may be conducted at any temperature comprised between ambient temperature up to boiling point.

Once the reaction of Step 3 is complete, the precipitated lead oxide or hydroxide or carbonate/oxycarbonate is separated by filtration (Step 4 of the flow chart of FIG. 3) from the solution while sulphate of the cation of the hydroxide or carbonate used for precipitating the lead as insoluble oxide (or hydroxide) or carbonate (and/or oxycarbonate) remains in the solution.

The limpid acetate solution, now containing also the sulphate of the same cation of the acetate salt, can be integrally recycled to the suspension bath of selective dissolution of the lead sulphate (Step 1) of the process, for as long as the content of sulphate remains below saturation (this limit depends primarily on the type of dissolving salt solution of the lead sulphate and processing conditions).

Of course, precipitation of excess sulphate salt together with the lead oxide or hydroxide or carbonate/oxycarbonate must be prevented. Therefore, excess sulphate salt must be eventually eliminated from the solution, well before approaching the saturation limit (Step 8 of the flow sheet of FIG. 3). This may be easily done by exploiting the different solubilities at different temperatures of the sulphate salt (i.e. of sodium, potassium or ammonium sulphate) from that of the corresponding acetate salt for selectively crystallizing the sulphate and separating it from the acetate solution.

The concentration of the aqueous solubilizing salt solution and the temperature at which lead sulphate dissolution in it is carried out are not essential parameters because they simply influence the time necessary for completing the reactions discussed above and the quantity of lead sulphate that may be dissolved in the solution. In practice, if the solubilizing solution, after precipitation of the dissolved lead as oxide or hydroxide or carbonate/oxycarbonate, is recycled back and therefore one's operates with a recycled solution, more and more recycles may be necessary to complete dissolution of a given quantity of lead sulphate.

The novel approach of this disclosure has proved itself outstandingly suitable to process electrode paste slimes where the amounts of the three main lead compounds, namely lead sulphate, lead oxide and lead dioxide, oscillate in the vicinity of a mean value by a range of variability of about 2% by weight and this may in practice impede to calculate exactly the quantity of sulphuric acid solution for converting to sulphate all lead oxides present in the impure starting material.

Nevertheless, if in conducting the novel process of this disclosure sulphuric acid happens to be added in excess of the stoichiometrically necessary amount, after having precipitated the pure lead compound by adding a hydroxide or a carbonate of the same cation of the selected acetate salt, an excess of sulphate of the cation of the added compound forms compared to the amount strictly relative to the precipitation of lead sulphate, because of the presence in the solution of free sulphuric acid. Vice versa, if sulphuric acid happens to be added in defect of the stoichiometrically necessary amount, incomplete conversion of oxides to sulphate occurs, thus a residual amount of oxide remains undissolved in the acetate solution when separating the solid impurities. Should this accidentally occur, the separated solid phase may be simply reintroduced in the suspension bath to be eventually converted by introducing an excess of sulphuric acid.

Continuously or intermittently, whenever the sulphate concentration in the clear acetate salt solution approaches saturation, the solution is preferably percolated through a column filled with chelating resin for sequestering any residual lead ions in the solution (Step 5 of the flow sheet of FIG. 3), before cooling the solution to about 10° C. for precipitating a crystalline solid phase (Step 6 of the flow sheet of FIG. 3), constituted by sulphate of the cation of the acetate salt used, which is recovered by filtering (Step 7 of the flow sheet of FIG. 3). The clear acetate salt solution freed of the sulphate salt may then be recycled to the suspension bath of the impure starting material while the lead-free sulphate salt constitutes a marketable by-product.

Herein below several examples are reported solely for illustrating different possible embodiments of the process of this invention without in any manner meaning to exclude other possible embodiments.

Example 14

80 g of recovered dried electrode paste having a lead content, expressed as metal equivalent, of 72% was treated under stirring with 1000 ml aqueous solution of tri-hydrated sodium acetate at 37.5% by weight, with the addition of g 12.2 of concentrated sulphuric acid at 94-96% by weight, at the temperature of 83° C. Successively, hydrogen peroxide at 32% by weight was slowly added to the suspension (dropwise for about 10 minutes) until no further clarification of the suspension was observed.

The hot suspension was then filtered and the separated solid phase was constituted by insoluble lead compounds and lead compound concretions, electrode grid fragments and various additives used for making the electrode paste such as carbon black, barium sulphate, fibers, etc. and impurities such as sand, plastic materials, etc. The amount of this dark grey solid phase was about 4-12% by weight of the solid mass of the dry electrode paste.

The filtered limpid solution containing lead sulphate was stirred at 83° C. adding thereto sodium hydroxide until reaching a practically complete precipitation of the lead in the form of lead oxide. The suspension was thereafter filtered separating the precipitate from the solubilizing solution of sodium acetate now enriched of sodium sulphate that was recycled to the stirred lead sulphate dissolution vessel for as long as the content of sodium sulphate in the solution remained below saturation.

When the content of sodium sulphate in the sodium acetate solution became close to the saturation limit, the solution was percolated through a column filled with chelating resins, for example of the commercial type denominated Chelex-100 or Dowex A-1, though any other equivalent resin may be used. The resin filler sequestered almost completely the surprisingly small quantity of lead ions residually present in the sulphate solution.

Subsequently the purified sulphate solution (practically lead-free) was slowly cooled to 10° C., under slow stirring, for precipitating a crystalline solid phase constituted by sodium sulphate that was then recovered by filtering the suspension, while the clear solution was recycled to the dissolution vessel of the lead sulphate.

The filtered lead oxide accurately rinsed with de-ionized water was dried at 160° C. for as long as reaching constancy of weight.

The separated dark grey solid phase was suspended in sodium hydroxide at 40% by weight, at 50° C. for 15 minutes. The separated limpid liquid phase was introduced into the limpid acetate solution containing also the lead sulphate, as part of the required amount of sodium hydroxide for precipitating all lead in solution as lead oxide or hydroxide (according to a preferred embodiment) in consideration of the fact that also the lead present in the solution as sodium plumbite converts itself to lead oxide (or hydroxide).

At the end of the tests, the following mass balance was recorded.

In 80 g amount of recovered electrode paste used in an experiment, there were 4 g of insoluble substances of dark grey color containing metallic lead and extraneous substances such as sand, carbon black, barium sulphate and other substances in minor amounts.

The calculated maximum quantity of recoverable lead oxide was of 62.05 g while the quantity of lead oxide effectively recovered was of 62.03 g for a recovery yield of 99.96%.

Chemical analysis of the recovered solid product confirmed that it was constituted exclusively by PbO at 99.99% purity, while the sodium sulphate that was eventually recovered had a purity of about 99.90%.

The following table summarizes relevant conditions, peculiarities and results of other four exemplary embodiments of the process of Example 14, described in detail above, but with the indicated alternative conditions and the results that were obtained, always using as starting material electrode paste of the same lot recovered from crushed dismissed batteries.

The lead oxide (whether directly produced by the all-wet process or obtained by heating lead carbonate/oxycarbonate produced by the all-wet process) is perfectly suitable for preparing electrode pastes for new batteries.

The practice of the process of this invention using as starting material a mineral or a mixture of minerals of lead may be substantially similar to the above described embodiments, an essential pre-step being that of converting as much as possible any different salt of lead present in the mineral to either lead sulphate or to lead oxide. For example, in case of galena, the most common lead mineral, the mineral should be heated in air, according to common roasting techniques, until oxidizing the lead sulphite to sulphate. The other common mineral anglesite does not need any prior treatment being itself already constituted by lead sulphate. Of course the mineral(s) should be finely ground for facilitating their processing.

Figure 4:
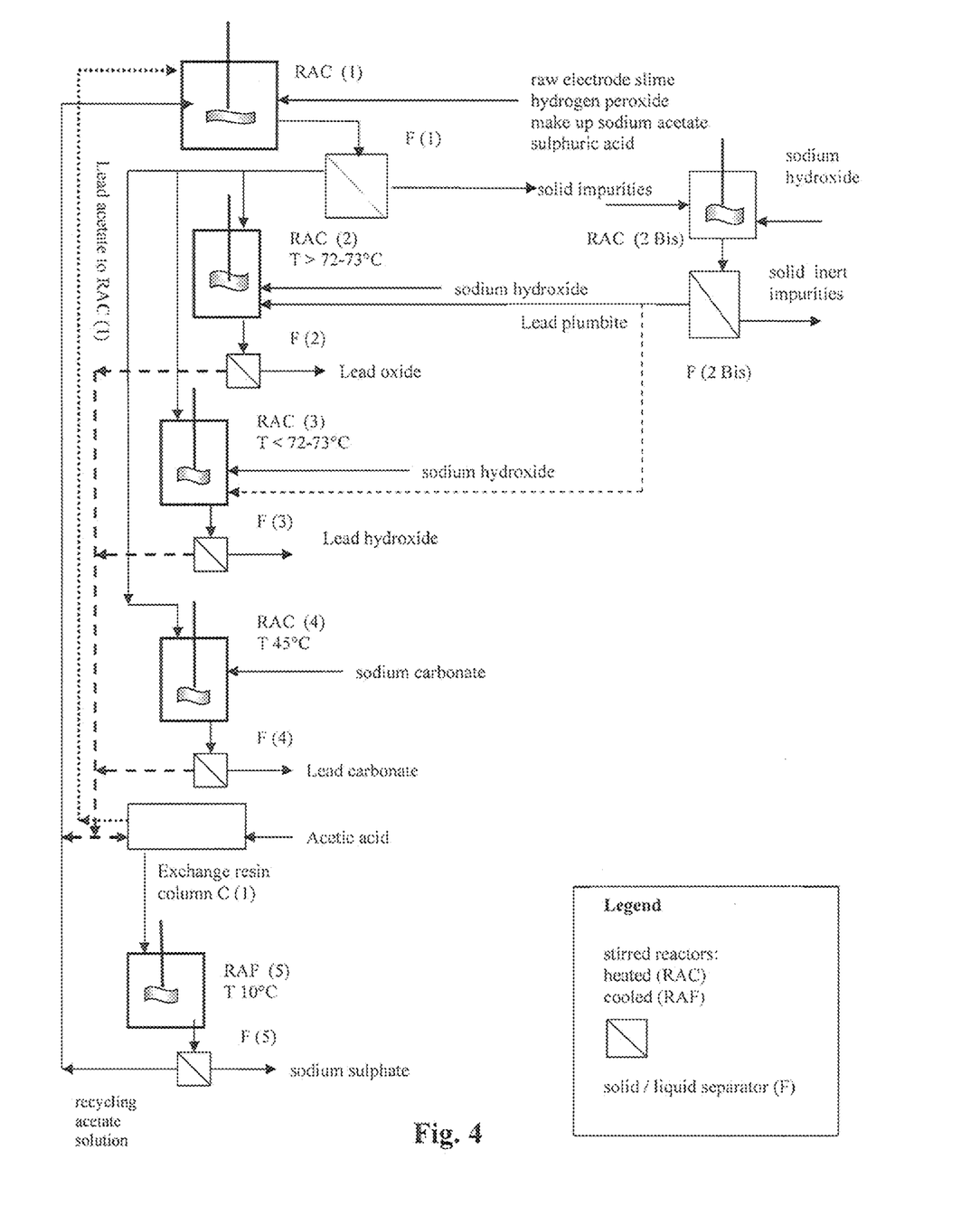
FIG. 4 is a simplified diagram of a plant for reclaiming highly pure lead compound from dismissed battery electrode slime or lead minerals, alternatively as pure lead carbonate/oxycarbonate or pure lead oxide/hydroxide, according to the alternative process of FIG. 3.

FIG. 4 is a schematic diagram of possible embodiments for an industrial plant for reclaiming variable lead in form of high purity compounds from recovered electrode paste of dismissed lead batteries and/or finally ground led minerals, eventually pretreated for converting as much of the lead compounds to lead sulphate.

The scheme of FIG. 4 provides a multi-embodiment illustration of the discussed processing alternatives (though sodium is indicated as the exemplary selected cation of both the acetate salt and of the alternatively added compounds for precipitating the desired pure compound of lead, according to the various alternatives).

In practice, the plant requires essentially three stirred and temperature-controlled reactors. To a first reactor RAC (1) in which the impure material is suspended in an aqueous acetate salt solution, is associated a first solid-liquid separator F(1) for separating the lead sulphate containing solution from the solid phase constituted by insoluble impurities of the impure starting material.

To a second reactor for precipitating the desired lead compound of high purity, that in the multiple alternative scheme of FIG. 4 is anyone of the reactors RAC (2), RAC (3) and RAC (4), is associated a second solid-liquid separator, that is the related one F(2), F(3) and F(4).

The third and last reactor RAC (5) and associated third and last solid-liquid separator F(5) are required for at least periodically (or more preferably continuously) treating the recycling acetate salt solution and to recycle it to the first sulphate dissolving reactor RAC (1). The treatment consists of selectively crystallizing by virtue of the significantly different solubilities of the acetate salt and of the sulphate of the same cation of the acetate salt, introduced in the second reactor for precipitating the desired lead compound, and removing it from the system. This step must be performed (continuously or intermittently) in order to prevent saturating the recycling acetate salt solution with the sulphate of the same cation, which if let to occur would cause co-precipitation of this salt together with the lead sulphate (making vain the purification process).

| n. | Lead sulphate dissolving solution | Reaction time and temperature | Precipitating compound | Obtained purified lead compound | Yield % |
|---|---|---|---|---|---|
| 2 | 1000 ml Sodium acetate, @37.5% | 10 minutes 65° C. | NaOH | Pb(OH)2 | 99.94 |
| 3 | 1000 ml Sodium acetate, @40.0% | 8 minutes 90° C. | NaOH | PbO | 99.95 |
| 4 | 1000 ml Sodium acetate, @42.5% | 12 minutes 45° C. | Na2CO3 | PbCO3 | 99.91 |

According to the preferred embodiment, in order to ensure that the "by-product" sulphate salt (e.g. sodium sulphate) be substantially lead-free and thus economically marketable, the plant may include an exchange resin column C(1) filled with an appropriate chelating resin, through which the solution, when directed to the selective sulphate crystallization reactor RAC (5) (whether continuously or periodically) passes, for sequestering residual lead ions that may be present in the solution.

Of course, the chelating resin filler will gradually loose its activity and periodically a stripping of sequestered lead ions must be carried out by circulating through the column (C1) acetic acid for a certain period of time. The lead ridden stripping solution of acetic acid used for this periodical re-activation of the exchange resin, now containing lead acetate, may be "disposed of" by simply introducing it into the first reactor RAC (1), as shown by the relative line.

The multi-embodiment plant diagram of FIG. 4, illustrates also the optional reactor RAC (2bis) in which, if desirable, in consideration of the composition of the impure starting material to be processed, residual amount of lead that may remain associated with the separated solid phase of impurities, in form of compounds or concretions that could not be dissolved during the treatment of the impure material in the first reactor RAC (1). The separated solid phase is suspended in hot concentrated solution of hydroxide of the same cation of the selected acetate salt for dissolving also these compounds of lead or concretions thereof. The associated liquid-solid separator F (2bis) permits to separate all non-lead impurities from a liquor of hydroxide containing sodium plumbite dissolved in it which may be conveniently used as part of hydroxide addition in a second reactor RAC (2) or RAC (3) that may be used for precipitating all the lead in the solution as lead oxide or lead hydroxide, according to a preferred embodiment.

The invention claimed is:

1. A process for reclaiming the lead content of impure electrode paste or slime from discarded batteries and/or lead minerals, in form of high purity lead compound comprising:
    a) suspending an impure lead containing material in an aqueous bath containing at least a lead oxide dissolving acid;
    b) reducing any insoluble lead dioxide to lead oxide by introducing into the suspension hydrogen peroxide, a sulphite or sulphurous anhydride;
    c) converting all dissolved lead oxide to lead sulphate in the aqueous bath;
    d) dissolving lead sulphate in an aqueous solution of an acetate salt;
    e) precipitating and separating purified lead compound by adding to said acetate salt solution a hydroxide of the same cation of said acetate salt.

2. A process for reclaiming the lead content of impure electrode paste or slime from discarded batteries and/or lead minerals, in form of high purity lead compound comprising:
    a) suspending impure starting material in an acid leach solution of an acid selected from the group consisting of acetic, nitric fluoboric and fluorosilicic acid;
    b) gradually introducing into the acid leach suspension a compound selected from the group consisting of hydrogen peroxide, sulphites and sulphurous hydroxide to reduce insoluble lead dioxide to soluble lead oxide;
    c) adding to the acid leach suspension sulphuric acid for converting dissolved lead oxide to insoluble lead sulphate;
    d) separating a solid phase constituted by lead sulphate and undissolved impurities from the acid leach suspension;
    e) selectively dissolving lead sulphate contained in said separated solid phase in an aqueous solution of at least a solubilizing compound selected from the group consisting of sodium acetate, potassium acetate and ammonium acetate;
    f) separating the solution containing dissolved lead sulphate from a solid phase residue including undissolved impurities;
    g) adding to the separated solution of lead sulphate a hydroxide of the same cation of said solubilizing compound for forming insoluble lead oxide or hydroxide, and a soluble sulphate of the same cation of the added hydroxide;
    h) separating an insoluble purified lead compound from the solution containing also sulphate of the cation of said solubilizing compound.

3. The process of claim 2, comprising gradually cooling or gradually heating a separated dissolving solution of an impure solid phase of precipitated lead sulphate and of insoluble impurities for selectively precipitating the sulphate of the cation of the solubilizing compound, and of separating it from a limpid dissolving solution that is recycled to step e), in order to maintain the sulphate concentration below saturation.

4. The process of claim 2, wherein sulphatation of the dissolved lead oxide is carried out by adding to an acid leach suspension sulphuric acid in a stoichiometric amount or slightly above based on an estimated content of dissolved lead oxide.

5. A process, for reclaiming the lead content of impure electrode paste or slime from discarded batteries and/or lead minerals, in form of high purity lead compound comprising:
    a) suspending an impure lead containing starting material in a lead sulphate dissolving aqueous solution of a salt belonging to the group composed of the acetates of sodium, potassium and ammonium;
    b) adding to the suspension sulphuric acid in an amount sufficient to convert all lead oxides to lead sulphate soluble in the acetate salt solution and slowly adding to the suspension either hydrogen peroxide or a sulphite or bubbling sulphurous anhydride in an amount, adapted to reduce any lead dioxide to lead oxide that is then converted to soluble lead sulphate by the sulphuric acid;
    c) separating a limpid acetate salt solution containing dissolved lead sulphate from a solid phase residue including all undissolved compounds and impurities;
    d) adding to the separated solution of lead sulphate either carbonate or hydroxide of the same cation of the acetate salt of the lead sulphate dissolving solution for precipitating highly pure lead carbonate, lead oxycarbonate or both or lead oxide or hydroxide, respectively, while forming sulphate of the cation, soluble in the acetate salt solution;
    e) separating a precipitated high purity lead compound from the acetate salt solution now containing sulphate of the same cation of the acetate salt.

6. The process of claim 5, wherein said acetate salt solution containing sulphate of the same cation of the acetate salt separated from the precipitated compound of lead is recycled to step a) and the increasing content of sulphate of the same cation in the solution is maintained below saturation limit by continuously or periodically cooling at least a portion of the solution separated from the precipitated lead compound to cause selective crystallization of sulphate salt of the same cation of the acetate salt and removing said sulphate salt as a by-product.

7. The process of claim 5, wherein prior to cooling for selectively precipitating sulphate salt of the same cation of the acetate salt, the solution is contacted with a chelating resin adapted to sequester any residual lead ions from the solution for selectively precipitating substantially lead-free sulphate salt of the same cation of the acetate salt, upon cooling.

8. The process of claim 5, wherein the selective dissolution of the lead sulphate is carried out by suspending an impure material in an aqueous solution of sodium acetate having a concentration comprised between 10 g and 120 g of salt in 100 g of water at a temperature comprised between 20° C. and boiling point, for a stirring time of between 5 and 180 minutes.

9. The process of claim 5, wherein selective dissolution of the lead sulphate is carried out by suspending an impure material in an aqueous solution of ammonium acetate having a concentration comprised between 20 g and 120 g of salt in 100 g of water at a temperature comprised between 20° C. and boiling point, for a stirring time of between 5 and 180 minutes.

10. The process of claim 5, wherein selective dissolution of the lead sulphate is carried out by suspending an impure material in an aqueous solution of potassium acetate having a concentration comprised between 20 g and 120 g of salt in 100 g of water at a temperature comprised between 20° C. and boiling point, for a stirring time of between 5 and 180 minutes.

11. The process of claim 5, further comprising suspending a separated solid phase residue including all undissolved compounds and impurities in hot concentrated hydroxide of the same cation of the selected acetate salt for converting and dissolve compounds of lead or concretions thereof that could not be dissolved in the acetate salt solution in form of plumbite salt of the hydroxide cation, separating a lead plumbite containing alkaline liquor from a solid phase of impurities contained in the starting material and adding the separated lead plumbite containing liquor to the separated acetate solution for precipitating all reclaimable lead as highly pure lead compound.

* * * * *